Oct. 8, 1935.                    E. C. LONG                    2,016,379
                    PISTON FOR INTERNAL COMBUSTION MOTORS
                           Filed Nov. 25, 1932
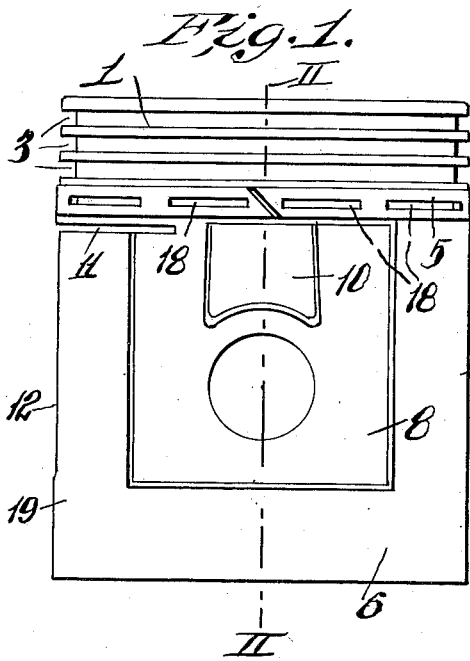
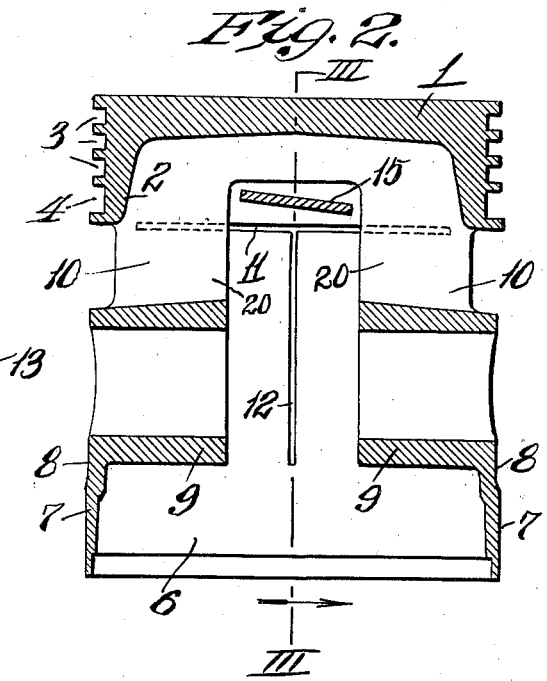
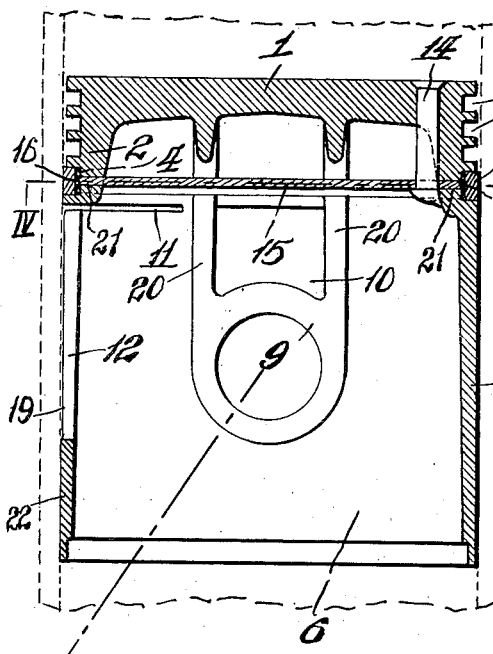
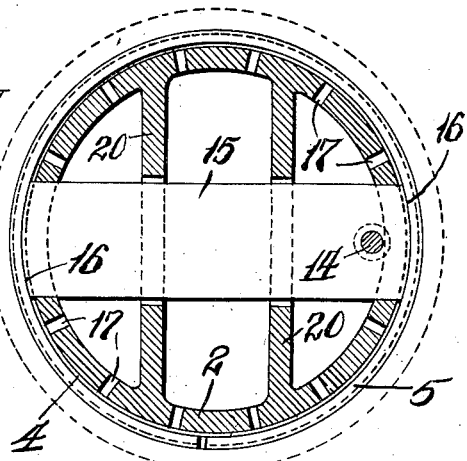
Inventor:
Elmer C. Long
By Herbert S. Fletcher
atty.

Patented Oct. 8, 1935

2,016,379

UNITED STATES PATENT OFFICE 2,016,379

PISTON FOR INTERNAL COMBUSTION MOTORS

Elmer C. Long, Detroit, Mich.

Application November 25, 1932, Serial No. 644,227

2 Claims. (Cl. 309—5)

This invention relates to certain improvements in pistons for internal combustion motors and has for its primary object to provide means in a piston of an improved construction for eliminating piston slap during the operation of the piston.

Another object of the invention is in providing an improved piston of a construction whereby the piston will have a bearing fit at all times on the bearing thrust side of the piston during the different thermal conditions in a motor cylinder in which the piston is reciprocated.

A further object of the invention is in providing a piston with an improved head construction in which means are provided for cooperation with one of the piston rings so that the cooperable piston ring will control the co-axial position of the piston in the cylinder, during when the piston is operating under thermal conditions.

A still further object of the invention is in providing a piston with improved means whereby the piston is held in a position in the cylinder by a specific piston ring thereof in a manner so that the power thrust side of the piston will always be in bearing contact with the cylinder.

Another still further object of the invention is in providing a piston with means whereby the thrust power side of the piston will be normally more tightly held in bearing contact with the cylinder.

Still another object of the invention is in providing a piston of an improved construction whereby the expansion take up of the piston will occur on the side of the piston opposite from the power thrust side thereof.

Other and further objects will appear in the specification and be specifically pointed out in the appended claims, reference being had to the accompanying drawing, exemplifying the invention, and in which:—

Figure 1 is a side elevation of this improved piston.

Figure 2 is a longitudinal vertical section taken through the piston approximately on the line II—II of Fig. 1.

Figure 3 is a longitudinal vertical section taken approximately on the line III—III of Fig. 2.

Figure 4 is an inverted transverse section taken approximately on the line IV—IV of Fig. 3.

Referring by numerals to the accompanying drawing 1 designates the piston head which is cup shaped and having the side wall 2, and formed in said side wall are the usual piston ring grooves 3 and a lower disposed large packing ring groove 4 for the reception of an oil ring 5 and extending downwardly from the wall 2 of the head 1 is a skirt 6.

The pin boss sides 7 of the piston are relieved or cut in as designated at 8 surroundingly of the pin bosses 9, each of which is inwardly extended from respective pin boss sides 7, and formed in each side 7 above each pin boss 9 is an opening 10.

The skirt 6 on one side adjacent the oil ring groove 4 and between the pin boss side 7 is provided with a transverse slot 11 and joining said slot is a longitudinally depending slot 12, said slots 11 and 12 forming a T-shape.

The side of the piston opposite from the T-shape slot is unslotted and is not separated in any way from the wall 2 of the head 1, said unslotted side providing the bearing or power thrust side 13 of the piston and mounted in the head 1 on the power thrust side and the side wall 2 of the head is a longitudinally disposed pin or rivet 14, said rivet passing through one end of a transversely disposed strut or strip 15 which is made of a material different than the piston, the ends of the strip 15 passing through the annular wall 2 of the head 1 and projecting into the ring groove 4 as designated at 16.

The wall 2 of the piston head 1 in the ring groove 4 is provided with a plurality of openings 17 for communication with the grooves 18 which are provided in the bull ring 5, said openings 17 and 18 permitting excess oil from the cylinder wall of the motor to entrain to the inside of the piston for return to the oil pan or crankcase of the motor.

The ends 16 of the transverse strip 15 are rounded in conformity with the inner periphery of the piston ring 5 and are adapted to engage the inner periphery of the ring at diametrically opposite points, i. e. on the power thrust side 13 of the piston and on the slotted side 19. A pair of longitudinally disposed webs 20 extending from the head 1 to respective pin bosses 9, said webs extending across the head and are formed integral therewith and the pin boss sides 7 of the piston.

At the present time, a piston of this character is preferably made of an aluminum alloy, and during the machining thereof after casting, the slots 11 and 12 are provided by saw cutting. Opposite slottings 21 are provided in the wall 2 of the head 1 in the ring groove 4 for inserting the strip 15, said slots 21 being inclined for holding the strut or strip 15 in a slanting position for minimizing the contacting wear of the ends 16 of the strip 15 on the inner periphery of the ring 5. After the seating of the strip 15, the pin 14 is then mounted in the strip through the aperture formed in the head of the piston, the pin then being fixedly secured by riveting the ends thereof.

In mounting the piston in a cylinder, the diameter of the outer periphery of the oil ring 5 across the length of the strip 15 will be the diameter of the cylinder minus clearance of a close fit, the outer surface of the ring 5 on the thrust side 13 of the piston skirt being flush with the thrust side so that the skirt of the piston on the thrust side will contact with the cylinder when the motor cylinder is cold. The piston on the slotted side 19 may be provided with a very slight clearance particularly on each side of the longitudinal slot 12, the lower portion 22 on the side 19 being given a sliding fit. Also, the diameter of the lower end of the piston across the pin boss sides beneath the pin bosses is provided with a clearance greater than the diameter across the sides 19 and 13 during the machining of the piston.

During the operation of this improved piston, obviously when the cylinder is cold, the holding position of the strip 15 with respect to the ring 5, will make the power thrust side 13 of the piston skirt contact with the power thrust side of the cylinder (the cylinder being shown in dotted lines in Figs. 3 and 4), consequently there will be no knock or back slap of the piston during the working stroke of the piston as there will be no play or separating of the thrust side of the piston from the cylinder wall.

As the piston expands under the influence of heat, the piston growth will travel in the direction opposite or away from the power thrust side 13 of the skirt owing to the fact that the piston is supported on the strip 15 by the pin 14 and the pin is secured to the piston directly on the power thrust side and consequently there is but little expansion on the thrust side of the piston between the pin 14 and the outer periphery of the power thrust side 13 by reason of the relatively small thickness of the piston body between the pin and the outer periphery of the thrust side 13. The growing or expanding of the piston towards the slotted side 19 thereof, will be taken up by the slottings 11 and 12 as the head of the piston is permitted to slide on the strip 15. As the co-efficiency of expansion of the strip 15, is much less than that of the aluminum alloy piston and consequently the expanding of the piston ring 5 across the points of contact of the strip 15 therewith will be practically nil and the set position of the ring 5 will at all times hold the piston in its elected position in the cylinder in which the thrust side 13 will be always in contact with the cylinder wall during changing thermal conditions in the cylinder.

The lower portion 22 on the slotted side 19 of the piston, will at no time too tightly engage the cylinder wall or seize as the clearance provided on the portion 22 will permit the skirt across the pin boss sides and beneath the pin bosses to be expanded by pressure exerted on the portion 22.

The inclined or slanting position of the strut 15 obviously prevents the ends of the strut engaging in the oil openings 18 of the ring 5 during turning movement of the ring as the ends of the strut will be presented to the oil openings 18 in a crossing relation.

While but one showing of the invention is disclosed and described, it is however obvious that minor changes can be made without departing from the scope of the invention.

What I claim is:—

1. A piston comprising a head, a skirt and pin bosses, a packing ring carried by said head, a strip of material different than the piston carried by said head in a side tilted position and secured at one end thereto at right angles to the pin bosses, and a packing ring having oil openings carried by said head having cooperable engagement with the ends of said strip.

2. A piston comprising a head and a skirt, a packing ring groove formed in the head, a transversely disposed side tilted strip mounted in the head having its ends extend into said groove, said strip being secured to the head adjacent one side thereof, and a packing ring having oil openings seated in said groove in contact with the ends of said strip.

ELMER C. LONG.